(12) United States Patent
Iorio

(10) Patent No.: US 9,009,734 B2
(45) Date of Patent: Apr. 14, 2015

(54) APPLICATION LEVEL SPECULATIVE PROCESSING

(75) Inventor: Francesco Iorio, Toronto (CA)

(73) Assignee: AUTODESK, Inc., San Rafael, CA (US)

( * ) Notice: Subject to any disclaimer, the term of this patent is extended or adjusted under 35 U.S.C. 154(b) by 306 days.

(21) Appl. No.: 13/413,448

(22) Filed: Mar. 6, 2012

(65) Prior Publication Data

US 2013/0239125 A1   Sep. 12, 2013

(51) Int. Cl.
*G06F 9/54* (2006.01)
*G06F 9/46* (2006.01)
*G06F 9/455* (2006.01)

(52) U.S. Cl.
CPC ............ *G06F 9/542* (2013.01); *G06F 9/45533* (2013.01); *G06F 9/466* (2013.01)

(58) Field of Classification Search
CPC . G06F 12/0862; G06F 9/3806; G06F 9/3844; G06F 9/382; G06F 9/3842
See application file for complete search history.

(56) References Cited

U.S. PATENT DOCUMENTS

| | | | |
|---|---|---|---|
| 5,748,489 A | 5/1998 | Beatty et al. | |
| 2001/0047467 A1* | 11/2001 | Yeh et al. ....................... | 712/228 |
| 2003/0014473 A1 | 1/2003 | Ohsawa et al. | |
| 2004/0154011 A1 | 8/2004 | Wang et al. | |
| 2006/0037003 A1 | 2/2006 | Long et al. | |
| 2006/0195849 A1 | 8/2006 | Peleska et al. | |
| 2006/0235927 A1 | 10/2006 | Bhakta et al. | |
| 2008/0127299 A1 | 5/2008 | Carter | |
| 2008/0276235 A1 | 11/2008 | Knauerhase et al. | |
| 2009/0210649 A1 | 8/2009 | Wan et al. | |
| 2010/0312858 A1 | 12/2010 | Mickens et al. | |
| 2011/0154331 A1 | 6/2011 | Ciano et al. | |
| 2011/0179254 A1 | 7/2011 | Yip et al. | |
| 2011/0197182 A1 | 8/2011 | Lachner et al. | |
| 2011/0239229 A1* | 9/2011 | Meijer et al. .................. | 719/318 |
| 2011/0307689 A1 | 12/2011 | Chung et al. | |
| 2012/0124244 A1* | 5/2012 | Yew ................................. | 710/7 |
| 2012/0271876 A1* | 10/2012 | Martch ......................... | 709/203 |
| 2013/0055252 A1* | 2/2013 | Lagar-Cavilla et al. .......... | 718/1 |

OTHER PUBLICATIONS

PCT International Search Report and Written Opinion dated May 9, 2013, International Application No. PCT/US13/028317.
PCT International Search Report and Written Opinion dated Jan. 18, 2013, International Application No. PCT/US2012/061990.
Non-Final Office Action dated Mar. 26, 2013, U.S. Appl. No. 13/282,059, filed Oct. 26, 2011, 16 pages.

(Continued)

*Primary Examiner* — H S Sough
*Assistant Examiner* — Syed Roni
(74) *Attorney, Agent, or Firm* — Artegis Law Group, LLP

(57) ABSTRACT

One or more embodiments of the invention is a computer-implemented method for speculatively executing application event responses. The method includes the steps of identifying one or more event responses that could be issued for execution by an application being executed by a master process, for each event response, generating a child process to execute the event response, determining that a first event response included in the one or more event responses has been issued for execution by the application, committing the child process associated with the first event response as a new master process, and aborting the master process and all child processes other than the child process associated with the first event response.

20 Claims, 8 Drawing Sheets

(56) References Cited

OTHER PUBLICATIONS

Final Office Action dated Sep. 5, 2013, U.S. Appl. No. 13/282,059, filed Oct. 26, 2011, 15 pages.
Advisory Action dated Nov. 18, 2013, U.S. Appl. No. 13/282,059, filed Oct. 26, 2011, 3 pages.
Notice of Allowance dated Jan. 15, 2014, U.S. Appl. No. 13/282,059, filed Oct. 26, 2011, 9 pages.
"Speculative Execution in a Distributed File System", Nightingale, 2006, pp. 1-32.
"The STAMPede Approach to Thread-Level Speculation", Steffan, 2005, pp. 1-48.

* cited by examiner

APPLICATION LEVEL SPECULATIVE PROCESSING

BACKGROUND OF THE INVENTION

1. Field of the Invention

The present invention relates generally to software application and, in particular, to application level speculative processing.

2. Description of the Related Art

Many applications are event-driven applications such that an event is raised asynchronously and, based on the response to that event, a series of operations are performed. There may be multiple responses to a single event, where each response initiates a different series of operations. One example of an event-driven application is a computer modeling software application that allows a user to create complex three-dimensional (3-D) models of objects.

While some operations initiated by an event response may be executed by a computing device quickly, oftentimes operations initiated by software applications require several processing cycles. When performing workflows that involve a large volume of event responses and the subsequent execution of operations, having to wait several processing cycles for each set of operations in the workflow to complete execution can be extremely tedious and time consuming. Such wait times are highly undesirable and may result in sub-optimal actions being performed in order to avoid having to spend significant amounts of time when waiting for execution to complete.

One solution to the above-mentioned problem is the speculative execution of code. However, to enable such speculative execution, the code needs to be extremely carefully designed to follow pre-defined data models that support speculative execution. Such a design process is not only difficult and increases development time but also not very pervasive. Therefore, many software applications exist today that are not built to support speculative execution.

As the foregoing illustrates, what is needed in the art is a mechanism for reducing the number of processing cycles needed to execute operations initiated by an application in response to an event.

SUMMARY OF THE INVENTION

One embodiment of the invention is a computer-implemented method for speculatively processing application event responses. The method includes the steps of identifying one or more event responses that could be issued for processing by an application executing on a computing device, determining whether the processing of a first event response requires an interaction with at least one resource included in the computing device other than a system memory, selecting a first type of speculative processing of the first event response when the first event response requires an interaction with the at least one resource, or selecting a second type of speculative processing of the first event response when the first event response does not require an interaction with the at least one resource Advantageously, by speculatively issuing event responses for processing, the techniques described herein reduce the overall wait time when event responses are being processed. If the event response selected for processing next has already been speculatively processed, then there is no subsequent processing needed. Further, even applications that are not built to support speculative execution can be executed in a manner that allows for the speculative issuance of event responses. In other words, the techniques described herein may be applied retroactively to existing event-driven applications, thus avoiding the time-consuming requirement of refactoring the data model of the existing application to support speculative execution.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
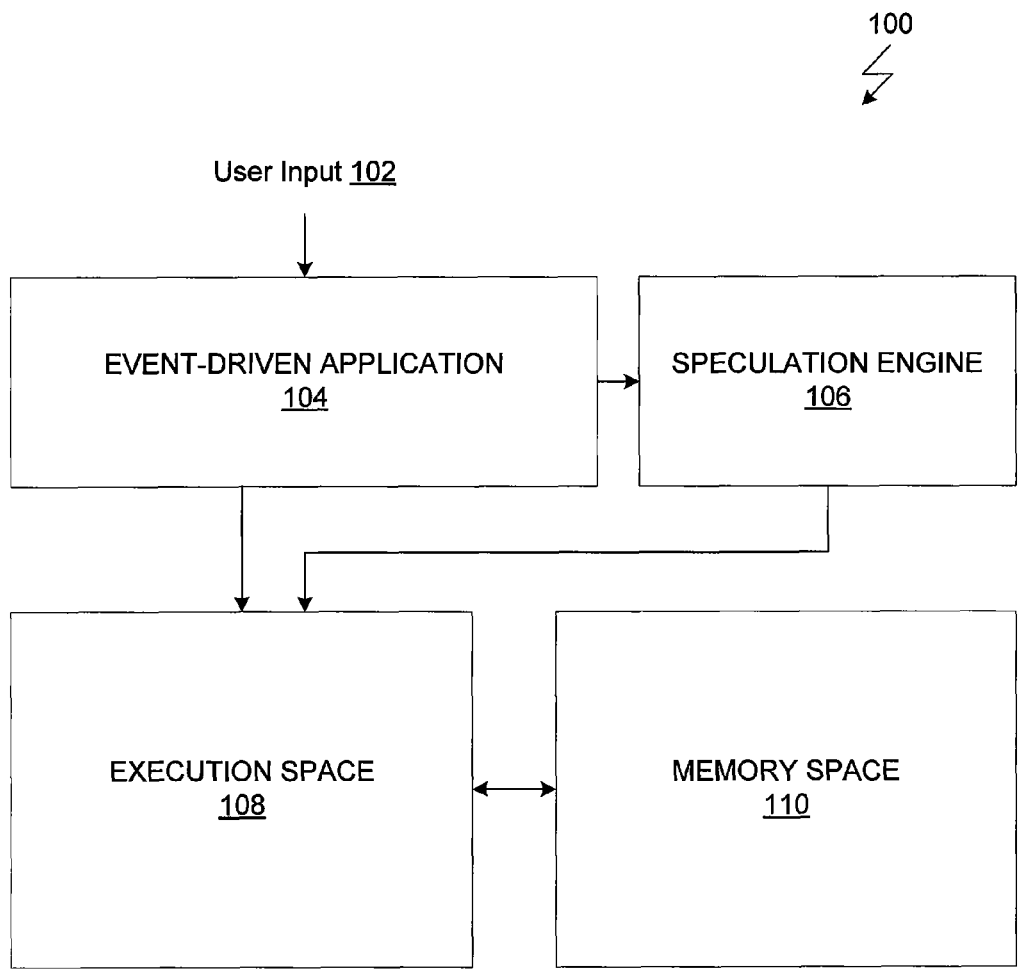
FIG. 1 is a computing environment configured implement one or more embodiments of the invention.

FIG. 1 is a computing environment 100 configured to implement one or more embodiments of the invention. As shown, the computing environment includes an event-driven application 104, a speculating engine 106, an execution space 108 and a memory space 110.

The event-driven application 104 is a software program that allows a series of operations to be performed via responses to events that are raised asynchronously. The event-driven application 104 can process data received from another application, physical sensors, user input, etc. and can output data to a terminal, to another application, to disk, etc. The event-driven application 104 may be a graphics application, a modeling application, such as AutoCAD, a word processing application, etc. In one embodiment, a user interacts with the event-driven application 104 via user input 102. A user input 102 may be an indication to process a particular event response, such as a draw event response in a modeling application.

The event-driven application 104 executes within the execution space 108. Typically, event responses are issued by the event-driven application 104 in response to a raised event, and those event responses are subsequently processed within the execution space 108. Further, the event-driven application 104 is allocated a portion of the memory space 110, such that memory access operations related to the event-driven application 104 are performed within the portion of the memory space 110 allocated to the event-driven application 104.

In some embodiments, event responses related to an application are organized in a hierarchical manner, such that once a particular event response at one level in the hierarchy is executed, any event responses at a subsequent level in the hierarchy may be executed.

The speculation engine 106 predicts future event responses that may be issued for processing by the event-driven application 104 and speculatively issues those event responses for processing within the execution space 108. The event responses are predicted based on an application state associated with the event-driven application 104 that, among other things, indicates the previous event response(s) that were issued by the application for processing, a context associated with the current operation of the event-driven application 104 and any events that were raised while the event-driven application 104 was executing. The speculation engine 106 evaluates the application state associated with the event-driven application 104 to identify certain event responses that have a high likelihood of being issued by the event-driven application 104 next. In one embodiment, the speculation engine 106 predicts event responses for processing based on an event response hierarchy related to the event response previously issued for execution by the event-driven application 104. In another embodiment, the speculation engine predicts event responses for processing based on a previously-collected event response processing history that indicates specific event responses that were issued for processing by the event-driven application 104 or similar applications after the current event response was issued for processing.

Before issuing a predicted event response for processing, the speculation engine 106 determines a level of abstraction associated with each predicted event response. For a particular event response, the level of abstraction associated with the event response is determined based on the components of the system 100 that are affected when the event response is processed. The levels of abstraction for different event responses range from simple memory operations to complex operations with externally visible side effects, such as display operations or network operations. For example, an event response that is associated with a high level of abstraction may only interact with or modify some portion of the system memory when the event response is processed. In contrast, an event response that has a low level of abstraction may require some transmission of data packets via the network card (not shown) included in the system 100.

The speculation engine 106 determines the type of speculative processing using which the event response is to be processed based on the level of abstraction associated with the event response. When issuing for processing a predicted event response associated with a low level of abstraction, the speculation engine 106 clones the process within the execution space 108 allocated to the event-driven application 104 and then issues the predicted event response for processing within the cloned process. The cloned process is also allocated an independent portion of memory within the memory space 110. Further details regarding the execution of the cloned processes are described in FIGS. 3-5 below. When issuing for processing a predicted event response associated with a high level of abstraction, the speculation engine 106 generates a transaction within the execution space 108 allocated to the event-driven application 104 and the predicted event response is then processed within the transaction. Further details regarding the execution of the event response within a transaction are described in FIG. 5 below.

In the case of processing the predicted event responses within clone processes, if the event response issued next by the event-driven application 104 matches one of the predicted event responses being processed in the clone process, then the speculation engine 106 selects the clone process as the master process. Any other clone processes and the original process executing the event-driven application 104 are then aborted. In an alternative embodiment, if the event response issued next by the event-driven application 104 matches one of the predicted event responses being processed in the clone process, then the master process absorbs the memory and I/O modifications made by the clone process. All the clone processes are then aborted.

In the case of processing the predicted event responses within transactions, if the event response issued next by the event-driven application 104 matches one of the predicted event responses being processed in a transaction, then the speculation engine 106 commits the transaction that processed the event response. Any other transactions executing the event-driven application 104 are then aborted or rolled back.

Figure 2:
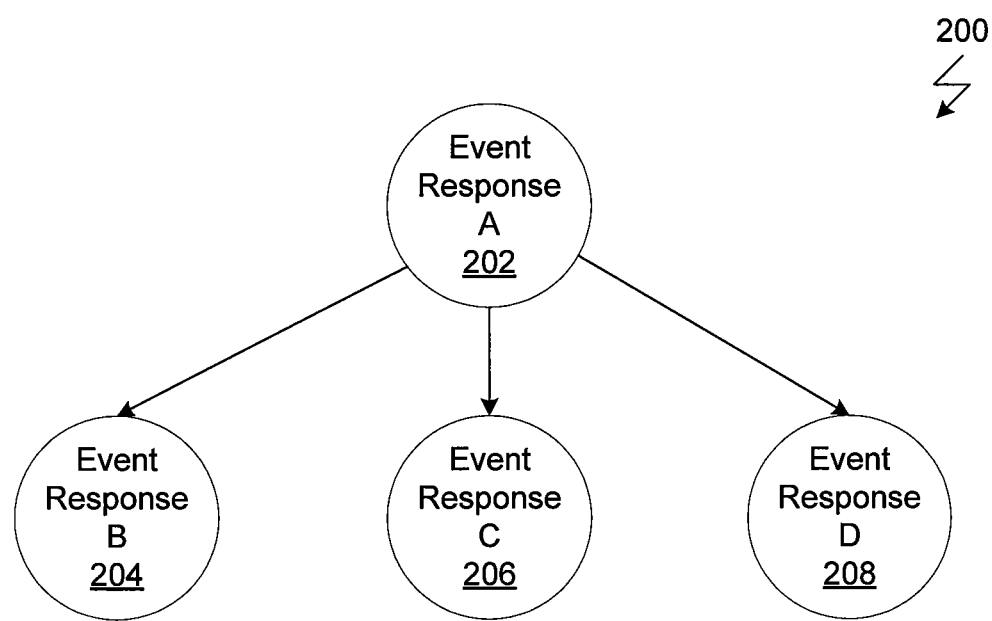
FIG. 2 illustrates an event response hierarchy related to the application of FIG. 1, according to one embodiment of the invention.
Figure 3:
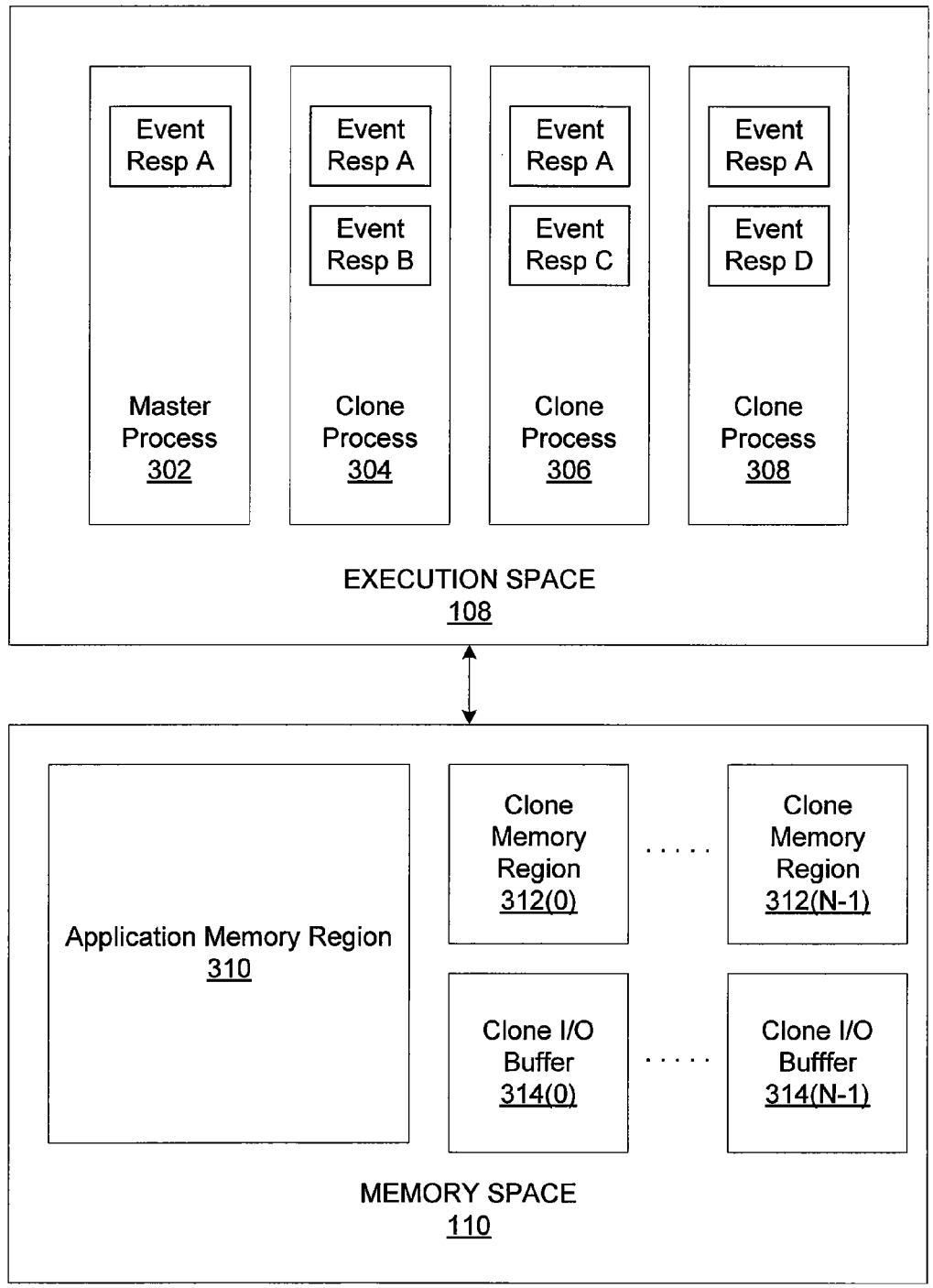
FIG. 3 is a more detailed view of the execution space and the memory space of FIG. 1, according to one embodiment of the invention.
Figure 4:
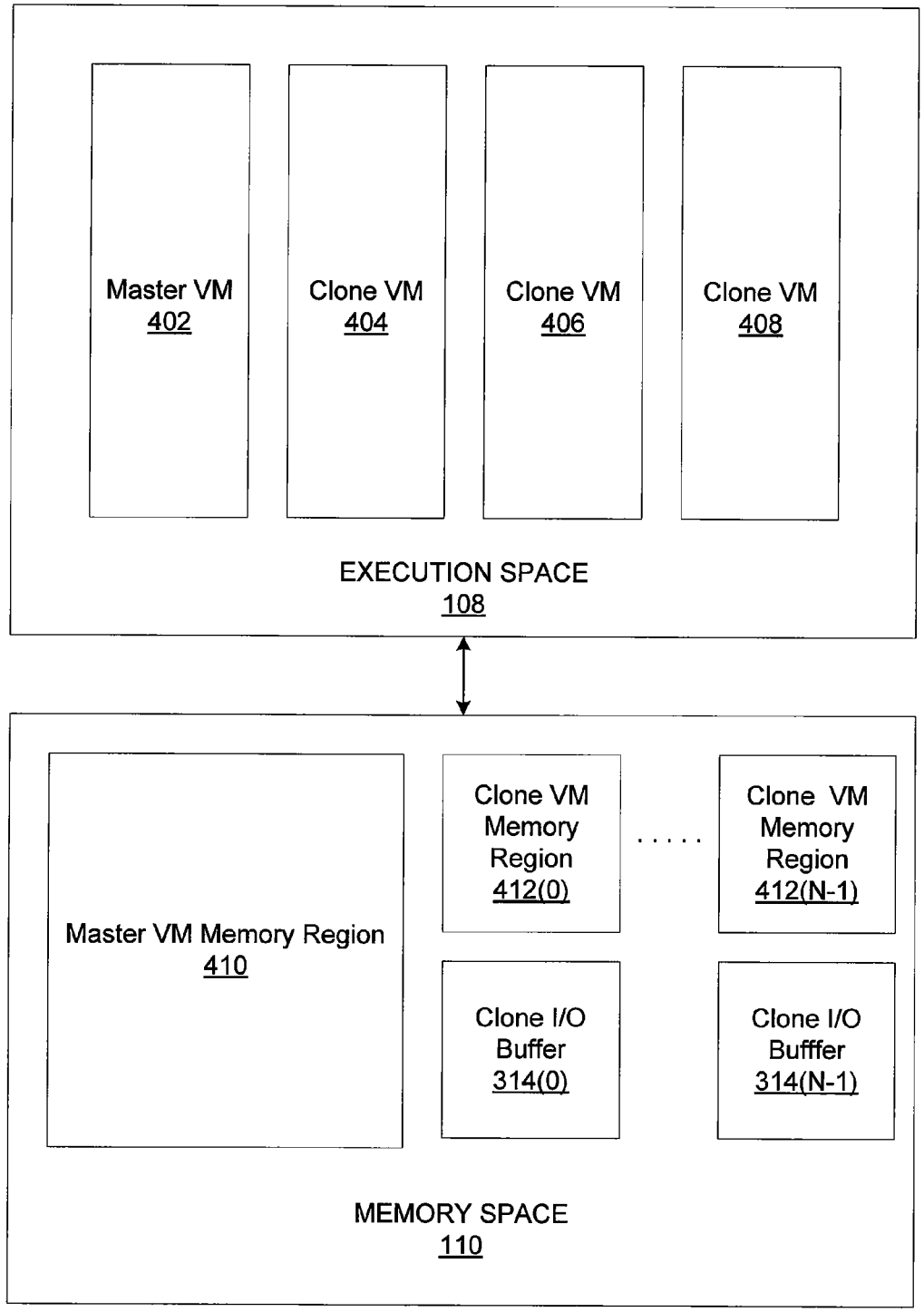
FIG. 4 is a more detailed view of the execution space and the memory space of FIG. 1, according to another embodiment of the invention.

FIG. 2 illustrates an event response hierarchy related to the application of FIG. 1, according to one embodiment of the invention. As shown, event response A 202 is linked to event response B 204, event response C 206 and event response D 208. If the event-driven application 104 issues the event response A 202, then any of the event responses 204-208 may be issued next by the event-driven application 104 as those event responses are in the subsequent level in the event response hierarchy 200. FIGS. 3 and 4 illustrate how the speculative engine 106 speculatively executes event responses based on the event response hierarchy 200.

FIG. 3 is a more detailed view of the execution space 108 and the memory space 110 of FIG. 1, according to one embodiment of the invention. As shown, the execution space 108 includes a master process 302, a clone process 304, a clone process 306 and a clone process 308. As also shown, the memory space 110 includes an application memory region 310, clone memory regions 312 and clone I/O buffers 314.

In the illustration of FIG. 3, the master process 302 is the process within which event responses issued by the event-driven application 104 execute, and the application memory region 310 is a memory portion within the memory space 110 allocated to the event-driven application 104. Event response A 202, which is being executed in the master process 302, was issued for processing by the event-driven application 104 within the master process 302. Subsequently, the speculation engine 106 predicts that there is a high likelihood that event response B 204, event response C 206 or event response D 208 are to be issued for processing by the event-driven application 104 next. Again, such predictions are based on the application state associated with the event-driven application 104 as well as the event response hierarchy 200 and any other historical execution information that the speculation engine 106 analyzes.

When issuing for processing a predicted event response that is associated with a low level of abstraction, the speculation engine 106 clones the process within which the event-driven application 104 is executing. The speculation engine 106 then schedules the predicted event response for processing within the cloned process. Thus, for each of the predicted event responses, event response B 204, event response C 206 or event response D 208, the speculating engine 106 creates a clone of the master process 302 and schedules the predicted event response for processing within the clone process. Clone process 304 is a clone of the master process 302 within which the speculation engine 106 has scheduled the predicted event response B 204 for processing. Similarly, clone process 306 and 308 are clones of the master process within which the speculation engine 106 has scheduled the predicted event response C 206 and the predicted event response D 208, respectively, for processing.

In addition, a different clone memory region 312 within the memory space 110 is allocated to each of the clone process 304-308. In one embodiment, the clone process 304-308 share data stored in the application memory region 310, such that only data that is to be modified, i.e., write data, is stored in the corresponding clone memory region 312. In another embodiment, when creating the clone process, the speculation engine 106 also clones the application memory region 310 and stores the cloned memory in the clone memory region 312 corresponding to the clone process. Further, a different clone I/O buffer 314 within the memory space 110 is allocated to each of the clone process 304-308. Any I/O operations initiated by a clone process are not performed and are buffered in the corresponding clone I/O buffer 314.

In one embodiment, if the event response issued next by the event-driven application 104 matches one of the predicted event responses being executed in the clone processes 304-308, then the speculation engine 106 selects the clone process associated with the matched event response as the master process. Any other clone process and the original process executing the event-driven application 104 are then aborted, and the data related to the selected clone process is committed to disk (not shown). In an alternative embodiment, if the event response issued next by the event-driven application 104 matches one of the predicted event responses being processed in the clone processes 304-308, then the master process absorbs the memory and I/O modifications made by the clone process. The clone processes 304-308 are then aborted.

In the embodiment where the clone process 304-308 share data stored in the application memory region 310, such that only write data is stored in the corresponding clone memory regions 312, the application memory region 310 and the clone memory region 312 corresponding to the selected clone process are combined to produce the memory region allocated to the new master process. Further, I/O operations buffered in the I/O buffer 314 allocated to the selected clone process are performed. These I/O operations include operations to disk, network operations, etc.

FIG. 4 is a more detailed view of the execution space 108 and the memory space 110 of FIG. 1, according to another embodiment of the invention. As shown, the execution space 108 includes a master virtual machine (VM) 402, a clone virtual machine 404, a clone virtual machine 406 and a clone virtual machine 408. Each of the VMs 402-408 are virtual machine processes. As also shown, the memory space 110 includes a master VM memory region 410, clone VM memory regions 412 and clone I/O buffers 414.

In the embodiment illustrated in FIG. 4, event responses associated with a low abstraction level and issued by the event-driven application 104 execute within the master VM 402 to which the master VM memory region 410 within the memory space 110 is allocated. When issuing a predicted event response for processing, the speculation engine 106 creates a clone of the master VM 402, such as the clone VM 404, and issues the predicted event response to the clone VM for processing. The clone VMs 404-408 are each allocated a different clone VM memory region 412 within the memory space 110. In one embodiment, the clone VMs 404-408 share data stored in the VM memory region 410, such that only data that is to be modified, i.e., write data, is stored in the corresponding VM memory region 412. In another embodiment, when creating the clone process, the speculation engine 106 also clones the VM memory region 410 and stores the cloned memory in the VM memory region 412 corresponding to the clone process. Further, a different clone I/O buffer 414 within the memory space 110 is allocated to each of the clone process 404-408. Any I/O operations initiated by a clone process are not performed and are buffered in the corresponding clone I/O buffer 414.

In one embodiment, if the event response issued next by the event-driven application 104 matches one of the predicted event responses being executed in the clone VMs 404-408, then the speculation engine 106 selects the clone VM associated with the matching event response as the master VM. Any other clone VMs and the original master VM 402 executing the event-driven application 104 are then aborted, and the data related to the selected clone VM is committed. Further, I/O operations buffered in the I/O buffer 414 allocated to the selected clone VM are performed. These I/O operations include operations to disk, network operations, any operations related to an external port, such as a universal serial bus (USB) port, etc.

In an alternative embodiment, if the event response issued next by the event-driven application 104 matches one of the predicted event responses being processed in the clone VMs 404-408, then the master VM 402 absorbs the memory modifications made by the selected clone VM. Further, I/O operations buffered in the I/O buffer 414 allocated to the selected clone VM are performed. The clone VMs 404-408 are then aborted.

Figure 5:
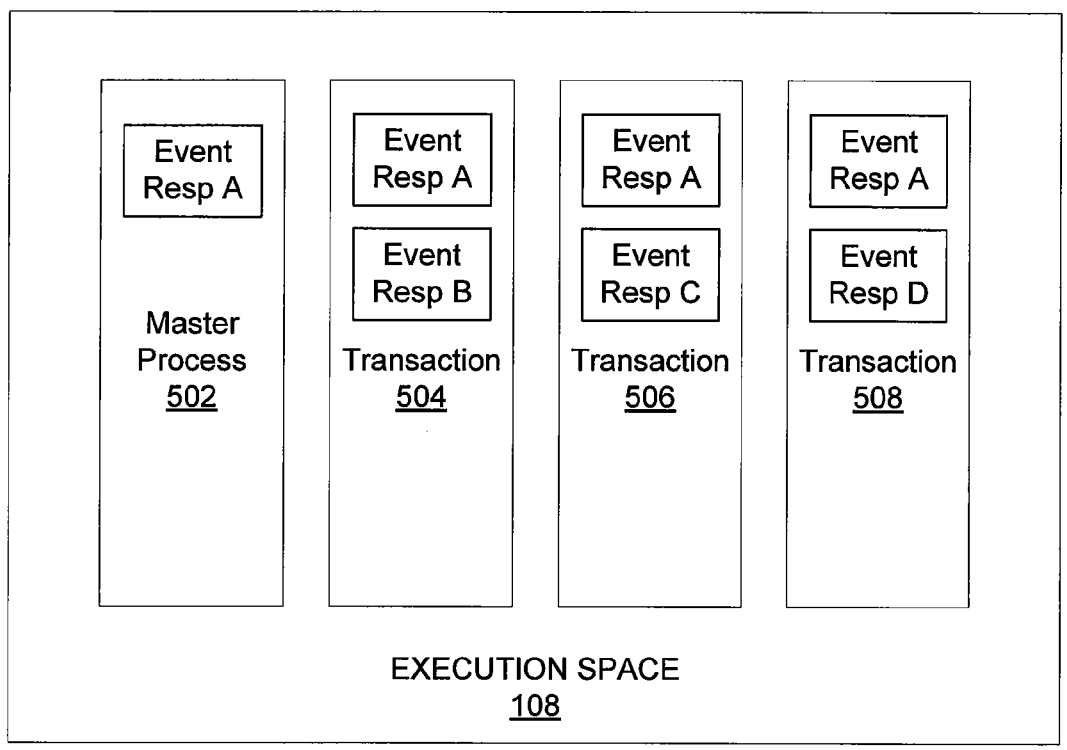
FIG. 5 is a more detailed view of the execution space and the memory space of FIG. 1, according to yet another embodiment of the invention.

FIG. 5 is a more detailed view of the execution space 108 of FIG. 1, according to yet another embodiment of the invention. As shown, the execution space 108 includes a master process 502, a transaction 504, a transaction 506 and a transaction 508.

In the illustration of FIG. 5, the master process 502 is the process within which event responses issued by the event-driven application 104 execute. Event response A 202, which is being executed in the master process 302, was issued for processing by the event-driven application 104 within the master process 302. Subsequently, the speculation engine 106 predicts that there is a high likelihood that event response B 204, event response C 206 or event response D 208 are to be issued for processing by the event-driven application 104 next. Again, such predictions are based on the application state associated with the event-driven application 104 as well as the event response hierarchy 200 and any other historical execution information that the speculation engine 106 analyzes.

When issuing for processing a predicted event response associated with a high abstraction level, the speculation engine 106 creates a transaction, such as a transaction 504, for processing the predicted event response. Thus, for each of the predicted event responses, event response B 204, event response C 206 or event response D 208, the speculating engine 106 creates a different transaction and schedules the predicted event response for processing within the transaction. For example, the speculation engine 106 schedules the predicted event response B 204 for processing within transaction 504. Similarly, the speculation engine 106 schedules the predicted event response C 206 and predicted event response D 208 for processing within transactions 506 and 508, respectively.

If the event response issued next by the event-driven application 104 matches one of the predicted event responses being processed in a transaction, then the speculation engine 106 commits the transaction that processed the event response. Any other transactions executing the event-driven application 104 are then aborted or rolled back.

In one embodiment, the transactions are created and managed by a Software Transactional Memory (STM) system, a Hardware Transactional Memory (HTM) system or a hybrid system.

Importantly, the embodiments described in FIG. 3, FIG. 4 and FIG. 5 provide different levels of abstraction. The embodiment in FIG. 3 has the ability to clone memory space and I/O subsystems across multiple processes. The embodiment in FIG. 4 has the ability to clone an entire system, thus providing speculation for event responses that may affect the behavior of additional components in the system apart from memory and disk.

Figure 6:
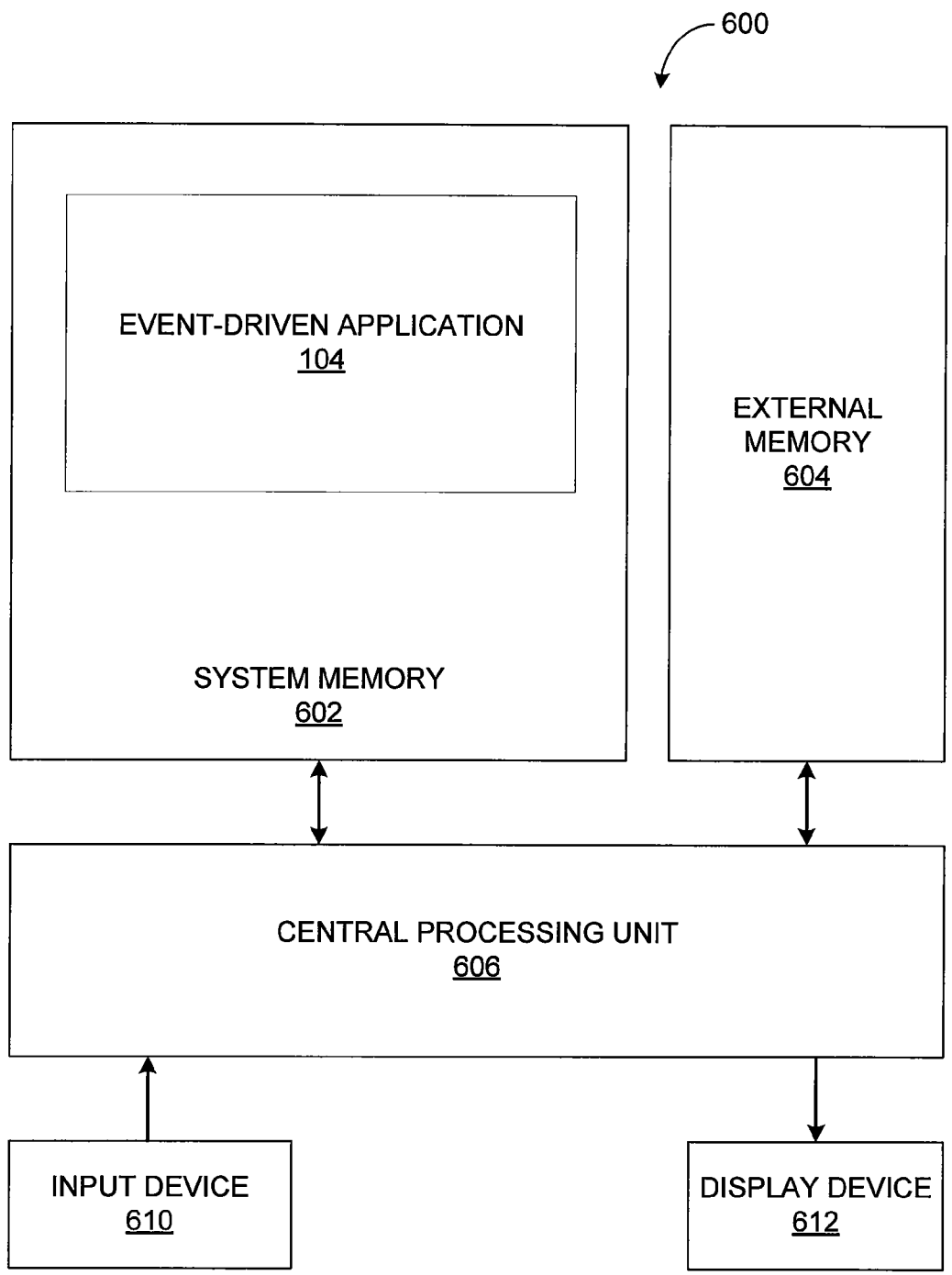
FIG. 6 is an exemplary system within which the application and speculative engine of FIG. 1 could execute, according to one embodiment of the invention.

FIG. 6 is an exemplary system within which the event-driven application 104 and speculation engine 106 of FIG. 1 could execute, according to one embodiment of the invention. As shown, the system 600 includes a system memory 602, an external memory 604, a central processing unit (CPU) 606, an input device 610 and an display device 612.

The system memory 602 includes the event-driven application 104 previously described herein. The system memory 602 is a memory space, usually a random access memory (RAM), that temporarily stores software programs running within the system 600 at any given time. The CPU 606 executes a sequence of stored instructions associated with and/or transmitted from the various elements in the computer system 600. The external memory 604 is a storage device, e.g. a hard disk, for storing data associated with the event-driven application 104. The input device 610 is an end-user controlled input device, e.g. a mouse or keyboard, that allows a user to manipulate various aspects of the event-driven application 104 and transmit inputs to the event-driven application 104, such as user input 102. The display device 612 may be a cathode-ray tube (CRT), a liquid crystal display (LCD) or any other type of display device.

Figure 7A:
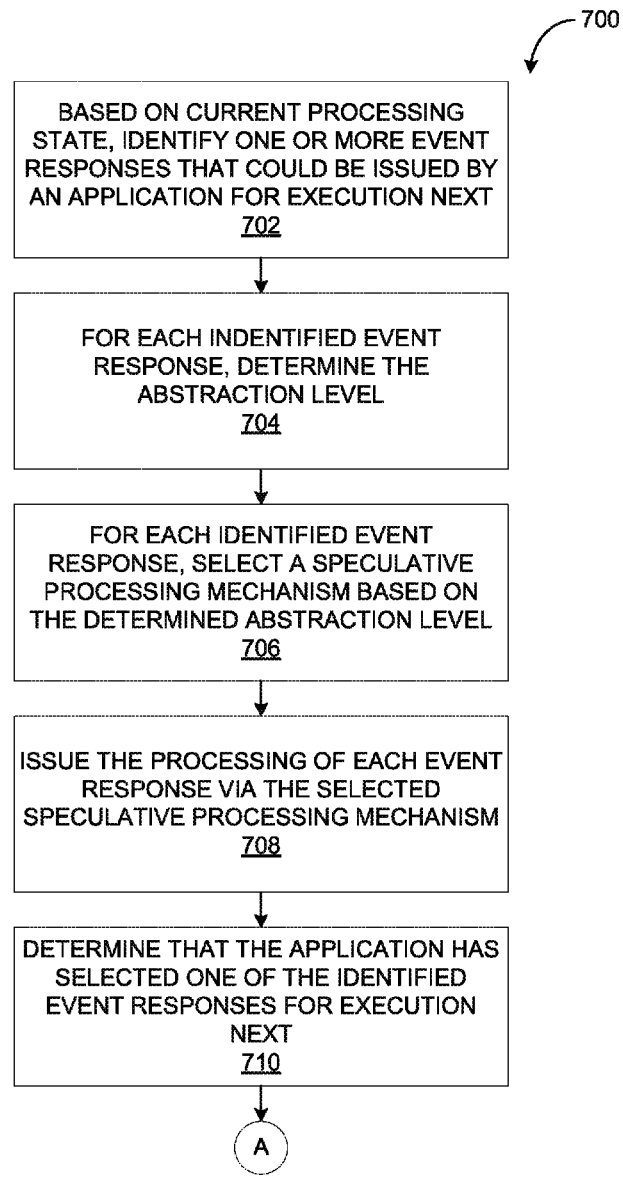
FIGS. 7A and 7B set forth a flow diagram of method steps for speculatively executing operations related to event responses that may be issued by an application, according to one embodiment of the invention.
Figure 7B:
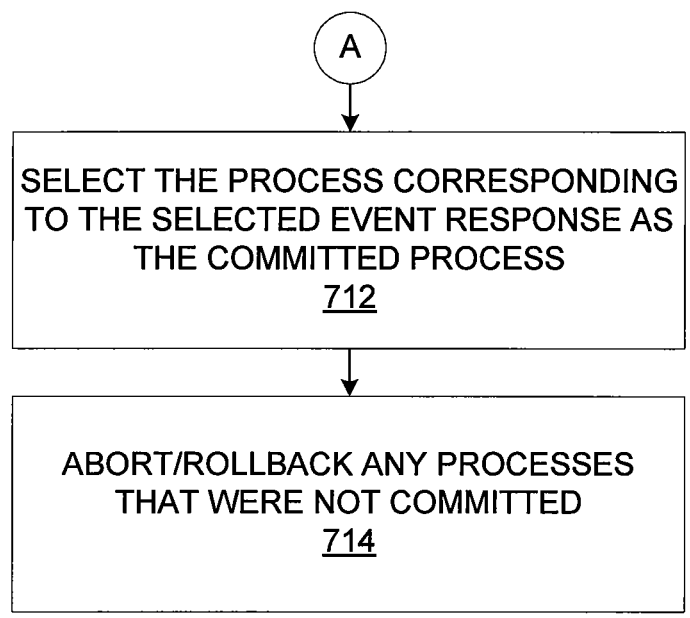

FIGS. 7A and 7B set forth a flow diagram of method steps for speculatively executing operations related to event responses that may be issued by an application, according to one embodiment of the invention. Although the method steps are described in conjunction with the systems for FIGS. 1-6, persons skilled in the art will understand that any system configured to perform the method steps, in any order, is within the scope of the invention.

The method 700 begins at step 702, where the speculation engine 106, based on the current application state associated with the event-driven application 104, identifies one or more event responses that may be issued for processing by the event-driven application 104 next. As previously described herein, the one or more event responses may be identified based on the most recent event response that was issued by the event-driven application 104, any events that were raised during the execution of the event-driven application 104, a previously-captured event response execution history, etc.

At step 704, the speculation engine 106 determines a level of abstraction associated with each predicted event response. For a particular event response, the level of abstraction associated with the event response is determined based on the components of the system 100 that are affected when the event response is processed. At step 706, for each identified event response, the speculation engine 106 determines, based on the level of abstraction associated with the event response, the type of speculative processing mechanism via which the event response is to be processed.

At step 708, for each identified event response, the speculation engine 106 issues the processing of the event response via the speculative processing mechanism selected at step 706. When issuing for processing a predicted event response associated with a low level of abstraction, the speculation engine 106 clones the process within the execution space 108 allocated to the event-driven application 104 and then issues the predicted event response for processing within the cloned process. The cloned process is also allocated an independent portion of memory within the memory space 110. In one embodiment, a clone process is an process, and, in another embodiment, a clone process is a virtual machine. When issuing for processing a predicted event response associated with a high level of abstraction, the speculation engine 106 generates a transaction within the execution space 108 allocated to the event-driven application 104 and the predicted event response is then processed within the transaction.

At step 710, the speculation engine 106 determines that the next event response issued for processing by the event-driven application 104 matches one of the event responses identified at step 702. The speculation engine 106 then, at step 712, selects the process within which the next event response was preemptively scheduled for processing. In the case of processing the next event response was within a clone process, the speculation engine 106 selects the clone process as the master process. In the case of processing the next event response was within a transaction, the speculation engine 106 commits the transaction that processed the event response. At step 714, the speculation engine 106 aborts any remaining clone processes or rolls back any remaining transactions.

In one embodiment, the speculative execution techniques described herein are applied to performing "undo" operations. Different clone processes may store previous states of the application, and, upon the issuance of an undo event, a clone process storing the previous state of the application may be selected as the master process.

Advantageously, by speculatively issuing event responses for processing, the techniques described herein reduce the overall wait time when event responses are being processed. If the event response selected for processing next has already been speculatively processed, then there is no subsequent processing needed. Further, even applications that are not built to support speculative execution can be executed in a manner that allows for the speculative issuance of event responses. In other words, the techniques described herein may be applied retroactively to existing event-driven applications, thus avoiding the time-consuming requirement of refactoring the data model of the existing application to support speculative execution.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for speculatively processing application event responses, the method comprising:
   identifying a plurality of event responses that could be issued for processing by an application executing on a computing device;
   determining whether processing a first event response included in the plurality of event responses requires an interaction with at least one resource included in the computing device other than a system memory;
   selecting a first type of speculative processing of the first event response upon determining that the first event response requires an interaction with the at least one resource;
   when the first type of speculative processing is selected, generating a clone process to process the first event response that is a clone of a master process that causes the application to execute on the computing device;
   determining whether processing a second event response included in the plurality of event responses requires an interaction with the at least one resource; and
   selecting a second type of speculative processing of the second event response upon determining that the second event response does not require an interaction with the at least one resource.

2. The method of claim 1, wherein the master process comprises a master virtual machine and the clone process comprises a clone virtual machine.

3. The method of claim 1, further comprising determining that the first event response has been issued for processing by the application, and replacing the master process with the clone process.

4. The method of claim 1, further comprising, when the second type of speculative processing is selected, generating a transaction to process the first event response.

5. The method of claim 4, wherein a master process causes the application to execute on the computing device, and further comprising determining that the first event response has been issued for processing by the application, and committing the transaction to the master process.

6. The method of claim 4, further comprising determining that the first event response has not been issued for processing by the application, and reversing the transaction.

7. The method of claim 1, wherein the at least one resource included in the computing device comprises a network interface card.

8. The method of claim 1, wherein the at least one resource included in the computing device comprises a hard-disk drive.

9. The method of claim 1, further comprising:
   based on determining that the first event response requires an interaction with the at least one resource, determining that the first event response is associated with a first level of abstraction, wherein selecting the first type of speculative processing of the first event response is based on determining that the first event response is associated with the first level of abstraction; and
   based on determining that the second event response does not require an interaction with the at least one resource, determining that the second event response is associated with a second level of abstraction, wherein selecting the second type of speculative processing of the second event response is based on determining that the second event response is associated with the second level of abstraction,
   wherein the second level of abstraction is higher than the first level of abstraction.

10. A non-transitory computer readable medium storing instructions that, when executed by a processor, cause the processor to speculatively process application event responses, by performing the steps of:
    identifying a plurality of event responses that could be issued for processing by an application executing on a computing device;
    determining whether processing a first event response included in the plurality of event responses requires an interaction with at least one resource included in the computing device other than a system memory;
    selecting a first type of speculative processing of the first event response upon determining that the first event response requires an interaction with the at least one resource;
    when the first type of speculative processing is selected, generating a clone process to process the first event response that is a clone of a master process that causes the application to execute on the computing device;
    determining whether processing a second event response included in the plurality of event responses requires an interaction with the at least one resource; and
    selecting a second type of speculative processing of the second event response upon determining that the second event response does not require an interaction with the at least one resource.

11. The non-transitory computer readable medium of claim 10, wherein the master process comprises a master virtual machine and the clone process comprises a clone virtual machine.

12. The non-transitory computer readable medium of claim 10, further comprising determining that the first event response has been issued for processing by the application, and replacing the master process with the clone process.

13. The non-transitory computer readable medium of claim 10, further comprising, when the second type of speculative processing is selected, generating a transaction to process the first event response.

14. The non-transitory computer readable medium of claim 13, wherein a master process causes the application to execute on the computing device, and further comprising determining that the first event response has been issued for processing by the application, and committing the transaction to the master process.

15. The non-transitory computer readable medium of claim 13, further comprising determining that the first event response has not been issued for processing by the application, and reversing the transaction.

16. The non-transitory computer readable medium of claim 10, wherein the at least one resource included in the computing device comprises a network interface card.

17. The non-transitory computer readable medium of claim 10, wherein the at least one resource included in the computing device comprises a hard-disk drive.

18. The non-transitory computer readable medium of claim 10, further comprising:
    based on determining that the first event response requires an interaction with the at least one resource, determining that the first event response is associated with a first level of abstraction, wherein selecting the first type of speculative processing of the first event response is based on determining that the first event response is associated with the first level of abstraction; and based on determining that the second event response does not require an interaction with the at least one resource, determining that the second event response is associated with a second level of abstraction, wherein selecting the second type of speculative processing of the second event response is based on determining that the second event response is associated with the second level of abstraction, wherein the second level of abstraction is higher than the first level of abstraction.

19. A computer system, comprising:

a memory; and a processor configured to:
  identify a plurality of event responses that could be issued for processing by an application executing on a computing device,
  determine whether processing a first event response included in the plurality of event responses requires an interaction with at least one resource included in the computing device other than a system memory;
  select a first type of speculative processing of the first event response upon determining that the first event response requires an interaction with the at least one resource;
  when the first type of speculative processing is selected, generate a clone process to process the first event response that is a clone of a master process that causes the application to execute on the computing device;
  determine whether processing a second event response included in the plurality of event responses requires an interaction with the at least one resource; and
  select a second type of speculative processing of the second event response upon determining that the second event response does not require an interaction with the at least one resource.

20. The computer system of claim 19, wherein the processor is further configured to, when the second type of speculative processing is selected, generate a transaction to process the first event response.

* * * * *